UNITED STATES PATENT OFFICE.

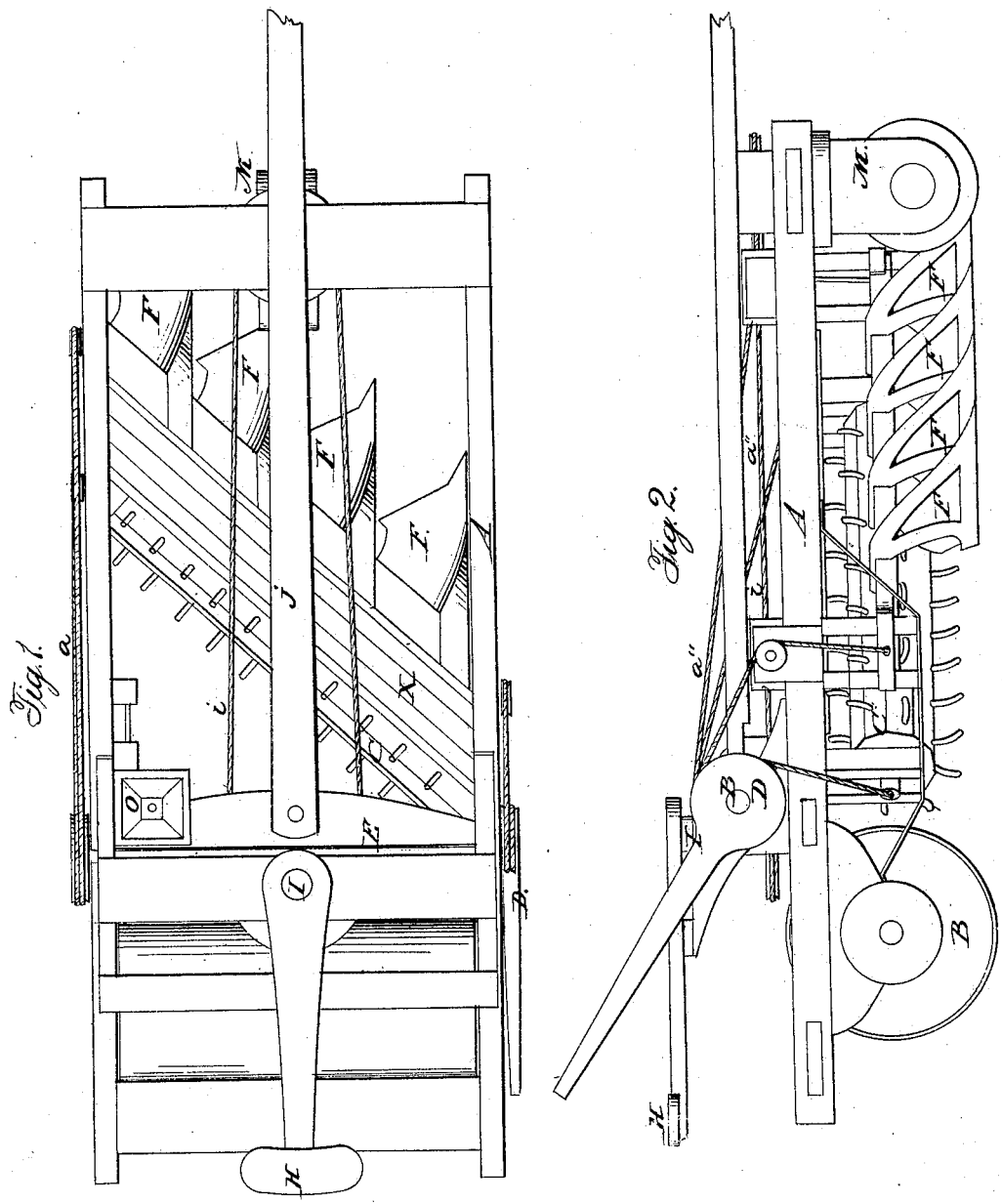

DAVID STOUDER, OF CLARINDA, IOWA.

IMPROVED SEEDING-MACHINE AND CULTIVATOR.

Specification forming part of Letters Patent No. 44,896, dated November 1, 1864.

*To all whom it may concern:*

Be it known that I, DAVID STOUDER, of the town of Clarinda, county of Page, and State of Iowa, have invented a new Harrow and Seeding-Machine; and I do declare that the following is a full and exact description thereof, reference being had to the accompanying drawings, and to the letters of reference marked thereon.

The nature of my invention consists in providing a new and useful machine for the agriculturist, by which he is enabled to sow his grain evenly and in such quantities as he may desire, and also to pulverize the ground thoroughly and cover the seed to any desirable depth at one operation.

To enable others skilled in the art to make and use my invention, I will proceed to describe its construction and operation.

Figure 1 is a top view of my improved cultivator and seeding-machine. Fig. 2 is a side view of the same, in which—

$A''$ represents a rectangular frame mounted on rollers or wheels $B''$ at the rear end of the frame, and on a caster-wheel, M, at the front end, as fully shown in Fig. 2.

$C''$ is a harrow, which rotates, and is hung in adjustable stirrups or bearings, and runs diagonally across the frame $A''$. In these stirrups or hangers are suitable boxes, in which the journals of the harrow-shaft run. The harrow-shaft may be elevated and lowered, as may be desired by the operator, by means of the lever $D''$, attached to shaft $E''$, which extends across the main frame $A''$, and secured in suitable bearings on each end of the shaft $E''$ are pulleys over which a cord or chain, $a$, passes. The ends of the cords or chains $a$ are secured to the respective ends of the harrow-shaft, while the other end is secured to the pulley on shaft $E''$, thus affording a ready and powerful means for elevating and lowering the harrow to any desirable depth of penetration.

The plows or cultivator-teeth $F''$ are firmly secured to a bar, $G''$, running diagonally across the frame $A''$ and in parallel line with the harrow-shaft heretofore described, and is operated by the same device and in the same manner as the harrow.

$H''$ is the driver's seat, fixed upon the upper end of a perpendicular shaft, $I''$. Upon this shaft $I''$ is a pulley secured fast, around which a cord or chain passes and extends forward to and around another pulley secured to the shaft of the caster-wheel. By this means the driver is enabled to control the machine at pleasure.

$O''$ is a seed-hopper by which seed may be sown in hills or drills, and may be operated by any well-known means, either by a slide-valve or a feed-cylinder.

$X''$ is a seed-box extending obliquely across the frame A and in parallel line with the plow and harrow, and may be used for sowing broadcast when desired, and may be placed either forward or in the rear of the plow and harrow.

$J''$ is the tongue, to which the team is attached and by which the machine is drawn.

Having thus described my invention, what I claim, and desire to secure by Letters Patent, is—

1. The governing device consisting of the caster-wheel $M''$, cord or chain, and driver's seat $H''$, all arranged and combined for the purpose of guiding the machine, as set forth.

2. The construction and arrangement of suspending the plows and rotating harrows suspended obliquely across the frame while at work, as herein specified.

DAVID STOUDER.

Witnesses:
   H. M. DELLINGER,
   JNO. W. MANKINS.